R. D. PETERS.
LINE DRYING REEL.
APPLICATION FILED JULY 28, 1916.
1,286,085.  Patented Nov. 26, 1918.
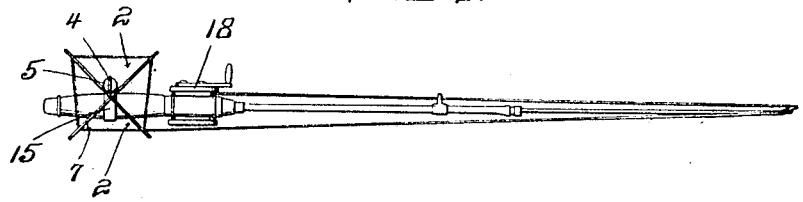
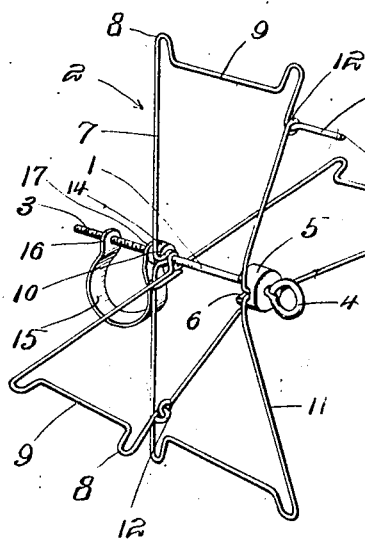
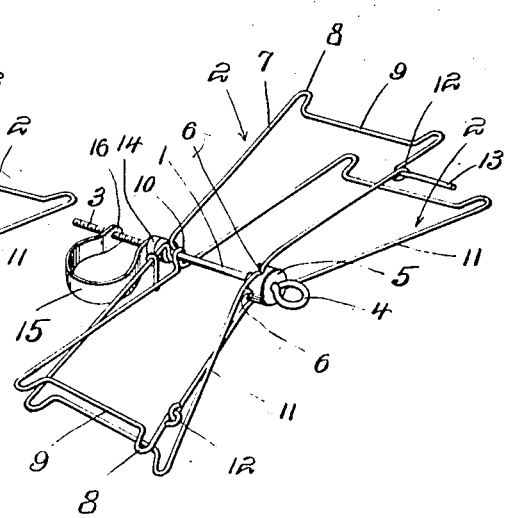
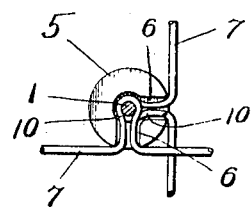
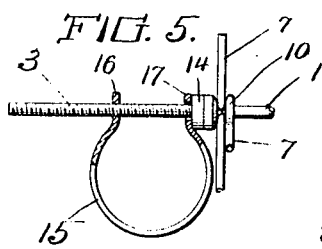
Inventor
R. D. Peters
By Victor J. Evans
Attorney
Witnesses
A. C. Newkirk
J. W. Garner

UNITED STATES PATENT OFFICE.

ROBERT D. PETERS, OF KNOX, INDIANA.

LINE-DRYING REEL.

1,286,085.  Specification of Letters Patent.  Patented Nov. 26, 1918.

Application filed July 28, 1916.  Serial No. 111,886.

*To all whom it may concern:*

Be it known that I, ROBERT D. PETERS, a citizen of the United States, residing at Knox, in the county of Starke and State of Indiana, have invented new and useful Improvements in Line-Drying Reels, of which the following is a specification.

This invention is an improved line drying reel for use on a fishing pole or rod in addition to the usual casting reel for drying the line after the same has been used and before winding up the line on the casting reel.

One object of the invention is to provide an improved drying reel of this kind which is cheap and simple in construction, is strong and durable and which can be readily folded and thus adapted to be placed in a tackle box when not in use.

Another object is to provide a reel of this kind with means whereby the same may be readily secured to or detached from a fishing pole.

Another object is to provide means for securing the foldable members of the reel, when the same are in extended position.

The invention consists in the features of construction, combination, and arrangement of devices, hereinafter fully described and claimed.

In the accompanying drawings:—

Figure 1 is an elevation of a fishing pole provided with a casting reel and also provided with a line drying reel constructed and arranged in accordance with my invention.

Fig. 2 is a perspective view of the drying reel in extended position.

Fig. 3 is a similar view of the same in folded position.

Figs. 4 and 5 are detail sectional views.

In the embodiment of my invention, I provide a pivoting element 1 which is here shown as a wire rod of suitable length and I also provide a pair of reel members 2. The pivoting element 1 has a threaded portion 3 extending from one end and is provided at the opposite end with an eye 4. At the inner side of the eye, the pivoting element is provided with a locking member 5 which is provided on its inner side with crossed locking grooves 6.

The reel members 2 may be made of wire, flat stock, wood, or of any other suitable material. Each reel member is here shown as made of a single wire bent to form a pair of oppositely extending reel arms 7 provided with U-shaped projections 8, at the outer corners, and cross bars 9 between said projections. The sides of each reel member are bent at the center to form laterally extending bearings 10, through which the pivoting element 1 extends and hence the pivot on which the reel members are mounted is at one side of the planes of the reel members as shown. The outer side 11 of each reel member is arcuate in form and extends inwardly toward the center. The ends of the wires of which the reel members are formed are jointed together as at 12 and one of the reel members is provided also at the joint with an outwardly extending handle portion 3 by means of which reel members may be readily revolved on the pivoting element. The reel members are resilient so that their sides form springs and tend to move outwardly at the center. A pair of nuts 14 are screwed on the pivoting member and bear against the bearing of one of the reel members so that the reel members are pivotally held on the element 1 between the nuts and the locking member 5. When the reel members are in extended position, at right angles to each other, to arrange the reel for use, their outer sides engage in the cross grooves 6 of the locking member 5 and hence the reel members are securely locked in relative extended position. When it is desired to fold the reel members compactly as shown in Fig. 3 to enable the drying reel to be placed in a tackle box or otherwise compactly disposed of, the outer sides of the reel members must first be sprung inwardly a slight distance to disengage them from the said locking grooves 6.

Within the scope of my invention, any suitable means may be provided for securing the reel members when in extended position and thus enable them to be simultaneously revolved on the pivoting member when one of them is turned by its handle or crank 13.

I also provide means for attaching the drying reel to a fishing pole and to enable the drying reel to be readily detached from the fishing pole when desired.

The attaching member is here shown as a spring clip 15 which forms an open ring of suitable diameter and is provided with out-turned ends 16, 17. The end 17 which is next the outer nut 14 has an unthreaded opening of larger diameter than the portion 3 of the pivoting element 1 and through which said pivoting element extends. The end 16 of the clip spring has a threaded opening which is engaged by the threaded portion of the pivot element 1. Hence by turning said pivoting element in one direction by means of its eye 4, the ends of the spring clip may be drawn toward each other to contract and fasten the spring clip around the fishing pole and by turning the pivoting element in the reverse direction, the ends of the spring clip may be moved apart to permit the detachment thereof from the fishing pole. Hence the drying reel may be readily attached to the pole and detached therefrom at will.

When in use, the drying reel is arranged on the opposite side of the pole from the usual casting reel 18, as shown in Fig. 1. By winding the line off the small or casting reel, onto the drying reel the line may be thoroughly dried in a very few minutes. The line may then be reeled back on the casting reel. The drying reel may be left attached to the rod or pole, while the angler is resting at meals or at night and takes up but very little space on the pole. When the line has been dried, the drying reel may be very readily removed from the pole if desired and placed in the tackle box.

From the foregoing description, taken in connection with the accompanying drawings, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such changes may be made when desired as are within the scope of the appended claims.

Having described the invention, what is claimed is:

1. A foldable reel comprising a pivot rod, reel members each having laterally extending bearings through which the pivot rod extends and a locking member on the pivot rod and having crossed locking grooves for engagement by said laterally extending bearings on the reel members.

2. In combination, a reel, a rod on which the reel is mounted for rotation, said rod having a threaded portion, and an open ring spring clip having one end loosely mounted on said rod and the other end engaged with the threaded portion thereof, said clip and threaded rod coacting to secure the reel on a fishing rod.

3. A foldable reel comprising a pivoting element, members mounted on the pivot element for movement to either folded or extended position, and attaching means for the reel also on said pivot element, said pivot element having a threaded portion and said attaching means comprising an open ring spring clip having one end loosely mounted on said pivot element and the other end engaged with the threaded portion of said pivot element.

In testimony whereof I affix my signature.

ROBERT D. PETERS.

Copies of this patent may be obtained for five cents each, by addressing the "Commissioner of Patents, Washington, D. C."